US012513461B2

(12) United States Patent
Deguchi

(10) Patent No.: US 12,513,461 B2
(45) Date of Patent: Dec. 30, 2025

(54) AUDIO REPRODUCTION DEVICE, AUDIO REPRODUCTION LSI, AND AUDIO REPRODUCTION METHOD

(71) Applicant: LAPIS Technology Co., Ltd., Yokohama (JP)

(72) Inventor: Yuuki Deguchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 243 days.

(21) Appl. No.: 18/356,196

(22) Filed: Jul. 20, 2023

(65) Prior Publication Data

US 2024/0040311 A1 Feb. 1, 2024

(30) Foreign Application Priority Data

Jul. 29, 2022 (JP) ................................ 2022-121317

(51) Int. Cl.
*H04R 3/04* (2006.01)

(52) U.S. Cl.
CPC .......... *H04R 3/04* (2013.01); *H04R 2430/01* (2013.01)

(58) Field of Classification Search
CPC .. H04R 3/04; H04R 2430/01; H04R 2499/13; H04R 3/12; H04R 2430/00
USPC .............. 381/86, 104, 107, 109, 119; 369/3
See application file for complete search history.

(56) References Cited

U.S. PATENT DOCUMENTS

| | | | | |
|---|---|---|---|---|
| 2004/0008852 A1* | 1/2004 | Also | H04H 60/04 | |
| | | | 381/104 | |
| 2013/0336503 A1* | 12/2013 | Ferringo | G04G 13/026 | |
| | | | 381/119 | |
| 2019/0158201 A1* | 5/2019 | Saito | H04R 3/005 | |
| 2019/0222332 A1* | 7/2019 | Okabayashi | H04R 3/00 | |

FOREIGN PATENT DOCUMENTS

| | | |
|---|---|---|
| JP | 2011207390 | 10/2011 |

* cited by examiner

*Primary Examiner* — Xu Mei
(74) *Attorney, Agent, or Firm* — JCIPRNET

(57) ABSTRACT

An audio reproduction device includes a reproduction control part executing pitch fading processing of changing a frequency of audio during reproduction in stages or volume fading processing of changing a sound volume in stages, a pitch register storing a pitch setting value, a volume register storing a volume setting value, and a fading register storing a step setting value indicating a form of change in the pitch or volume fading processing. The reproduction control part changes the frequency in stages in a form based on the step setting value in response to change of the pitch setting value while having a pitch setting value after change as a target value, and changes the sound volume in stages in a form based on the step setting value in response to change of the volume setting value while having a volume setting value after change as a target value.

15 Claims, 9 Drawing Sheets

AUDIO REPRODUCTION DEVICE, AUDIO REPRODUCTION LSI, AND AUDIO REPRODUCTION METHOD

CROSS-REFERENCE TO RELATED APPLICATION

This application claims priority under 35 USC 119 from Japanese Patent Application No. 2022-121317 filed on Jul. 29, 2022, the disclosure of which is incorporated by reference herein.

BACKGROUND

Technical Field

The disclosure relates to an audio reproduction device, an audio reproduction LSI, and an audio reproduction method.

Description of Related Art

Regarding electric vehicles or electric hybrid vehicles traveling by means of an electric motor, since they make extremely less noise than engined cars at the time of low-speed traveling, vehicles equipped with a vehicle approach notification device that generates a sound for informing the outside of the vehicle of approach of a host vehicle (which will hereinafter be referred to as a vehicle approach sound) are commercialized. When the vehicle is traveling at a speed lower than a predetermined speed, the vehicle approach notification device changes a timbre of the vehicle approach sound in response to a traveling velocity thereof.

Regarding such a vehicle approach notification device, a device including a memory in which a plurality of pieces of timbre generation data having timbres different from each other is stored in advance in association with traveling velocities of a vehicle in advance has been proposed (for example, refer to Patent Document 1 (Japanese Patent Laid-Open No. 2011-207390)).

In the vehicle approach notification device, first, a timbre generation data piece indicating a synthesized sound corresponding to a current traveling velocity of the vehicle is read from the memory. Further, the vehicle approach notification device converts a combination of timbre generation data pieces which have been sequentially read from the memory into an analog audio signal and acoustically outputs this to the outside of the vehicle through a speaker.

In a notification device constituted of an audio reproduction LSI outputting audio and a host microcomputer controlling the audio reproduction LSI, when it is intended to change a pitch or a volume during reproduction of audio, a register provided inside an audio reproduction LSI is accessed via a serial interface or a parallel interface from the host microcomputer, and adjustment of the pitch or the volume is controlled by changing a setting value for the register. In addition, when it is intended to cause the pitch or the volume to be faded in or faded out, a fading function is realized by changing the setting value for the register in suitable time steps from the host microcomputer.

However, in a device having such a constitution, when a reproduced sound is fading-changed (faded in or faded out) by adjusting the pitch or the volume while audio is reproduced, there is a need to renew the setting value for the register at a desired fading-change interval. For this reason, it takes time to perform setting, and a timing at which the setting value is reflected does not become a regular timing. Therefore, there is a problem that a sound may not smoothly fade, resulting in an unnatural fading sound.

The disclosure provides an audio reproduction device capable of realizing a fading function for smooth change.

SUMMARY

An audio reproduction device according to the disclosure is a reproduction device reading audio data from a memory and reproducing audio. The audio reproduction device includes a reproduction control part constituted to be able to execute pitch fading proces sing of changing a frequency in stages or volume fading processing of changing a sound volume in stages during reproduction of audio; a pitch register storing a pitch setting value that is a setting value for a frequency in reproduction of the audio in response to access from the outside; a volume register storing a volume setting value that is a setting value for a sound volume in reproduction of the audio in response to access from the outside; and a fading register storing a step setting value that is a setting value for a form of change of a frequency or a sound volume in the pitch fading processing or the volume fading processing in response to access from the outside. The reproduction control part executes the pitch fading processing by changing the frequency of audio during reproduction in stages in a form based on the step setting value read from the fading register in response to change of the pitch setting value while having a pitch setting value after the change as a target value, and executes the volume fading processing by changing the sound volume of audio during reproduction in stages in a form based on the step setting value read from the fading register in response to change of the volume setting value while having a volume setting value after the change as a target value.

In addition, an audio reproduction LSI according to the disclosure includes a reproduction control part constituted to read audio data from a memory, reproduce audio, and be able to execute fading processing of changing a reproduction parameter in stages during reproduction of the audio; a setting register storing a parameter setting value that is a setting value for the reproduction parameter in response to access from the outside; and a fading register storing a step setting value that is a setting value for a form of change of the reproduction parameter in the fading processing in response to access from the outside. The reproduction control part executes the fading processing by changing the reproduction parameter of audio during reproduction in stages in a form based on the step setting value read from the fading register in response to change of the parameter setting value while having a parameter setting value after the change as a target value.

In addition, an audio reproduction method according to the disclosure is an audio reproduction method executed by an audio reproduction device reading audio data from a memory reproducing audio, and having a reproduction control part constituted to be able to execute pitch fading processing of changing a frequency in stages or volume fading processing of changing a sound volume in stages during reproduction of the audio; a pitch register storing a pitch setting value that is a setting value for a frequency in reproduction of the audio; a volume register storing a volume setting value that is a setting value for a sound volume in reproduction of the audio; and a fading register storing a step setting value that is a setting value for a form of change of a frequency or a sound volume in the pitch fading processing or the volume fading processing. The audio reproduction method includes reading the pitch setting value from the pitch register, reading the volume setting value from the volume register, reading the step setting value from the fading register, executing the pitch fading processing by changing the frequency of audio during reproduction in stages in a form based on the step setting value read from the fading register while having a pitch setting value after the change as a target value when the pitch setting value read from the pitch register has changed, and executing the volume fading processing by changing the sound volume of audio during reproduction in stages in a form based on the step setting value read from the fading register while having a volume setting value after the change as a target value when the volume setting value read from the volume register has changed.

According to the audio reproduction device of the disclosure, a pitch or a volume can be smoothly fading-changed.

DESCRIPTION OF THE EMBODIMENT

Examples of the disclosure will be described below in detail. In description and the accompanying drawings of the following examples, the same reference signs are applied to parts which are substantially the same or equivalent.

Example 1

Figure 1:
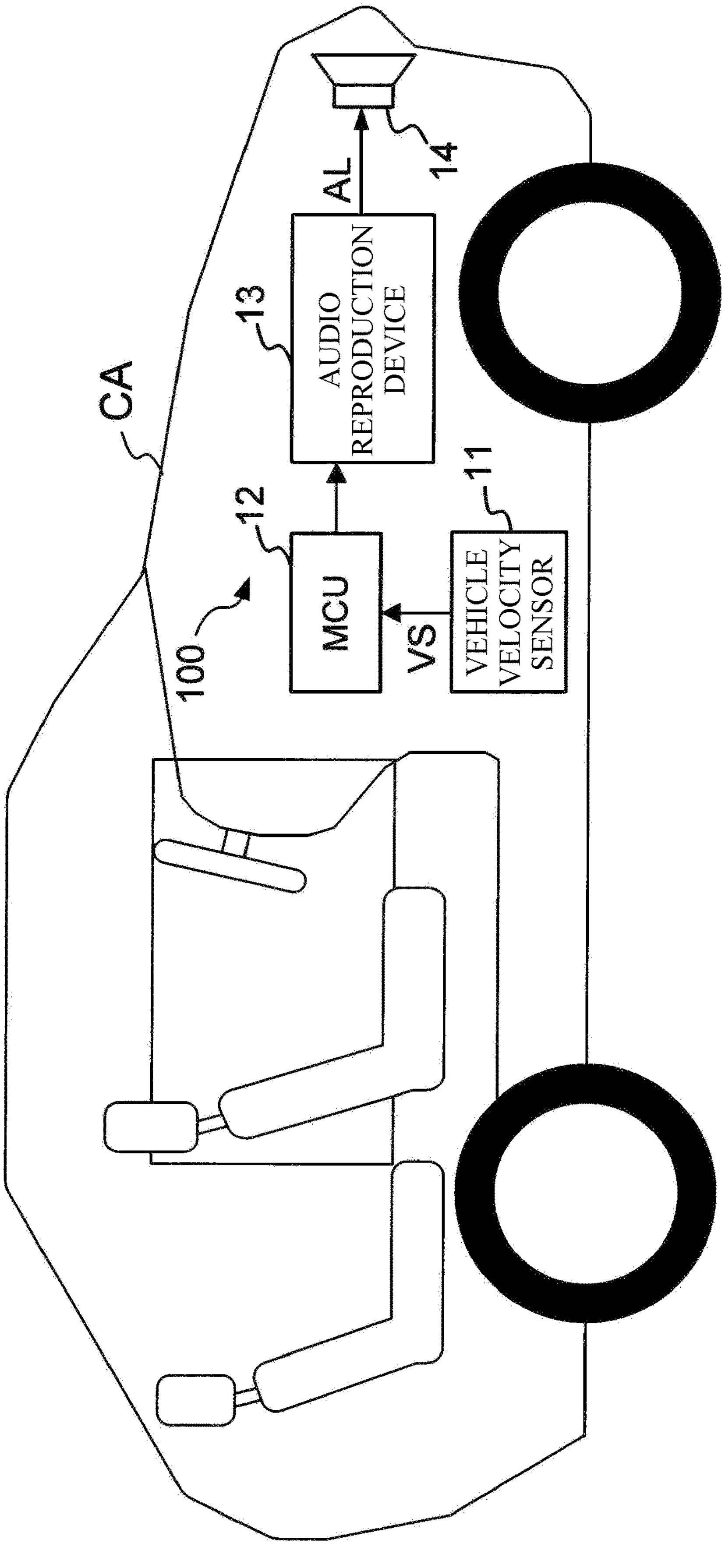
FIG. 1 is a block diagram showing a constitution of a vehicle approach notification system.

FIG. 1 is a block diagram showing a constitution of a vehicle approach notification system 100 according to the disclosure. The vehicle approach notification system 100 is an audio outputting system mounted in a vehicle CA and issues notification of approach of the vehicle CA by outputting audio corresponding to a traveling velocity of the vehicle CA (that is, a vehicle velocity).

The vehicle approach notification system 100 has a vehicle velocity sensor 11, an MCU 12, an audio reproduction device 13, and a speaker 14.

The vehicle velocity sensor 11 detects the traveling velocity of the vehicle CA and supplies a velocity signal VS indicating information of the traveling velocity to the MCU 12.

The micro controller unit (MCU) 12 is a host microcomputer controlling audio reproduction operation by the audio reproduction device 13. The MCU 12 controls the audio reproduction device 13 on the basis of the velocity signal VS and reproduces a vehicle approach sound having a pitch and a volume corresponding to the traveling velocity of the vehicle CA.

The audio reproduction device 13 is a reproduction device performing reproduction of audio data and is constituted as a large scale integration circuit (LSI). The audio reproduction device 13 generates a vehicle approach sound signal AL corresponding to the traveling velocity of the vehicle CA in response to control of the MCU 12 and supplies it to the speaker 14.

For example, the speaker 14 is installed in a front bumper of the vehicle CA and emits an audible sound based on the vehicle approach sound signal AL as a vehicle approach sound AS to a space outside the vehicle CA.

Figure 2:
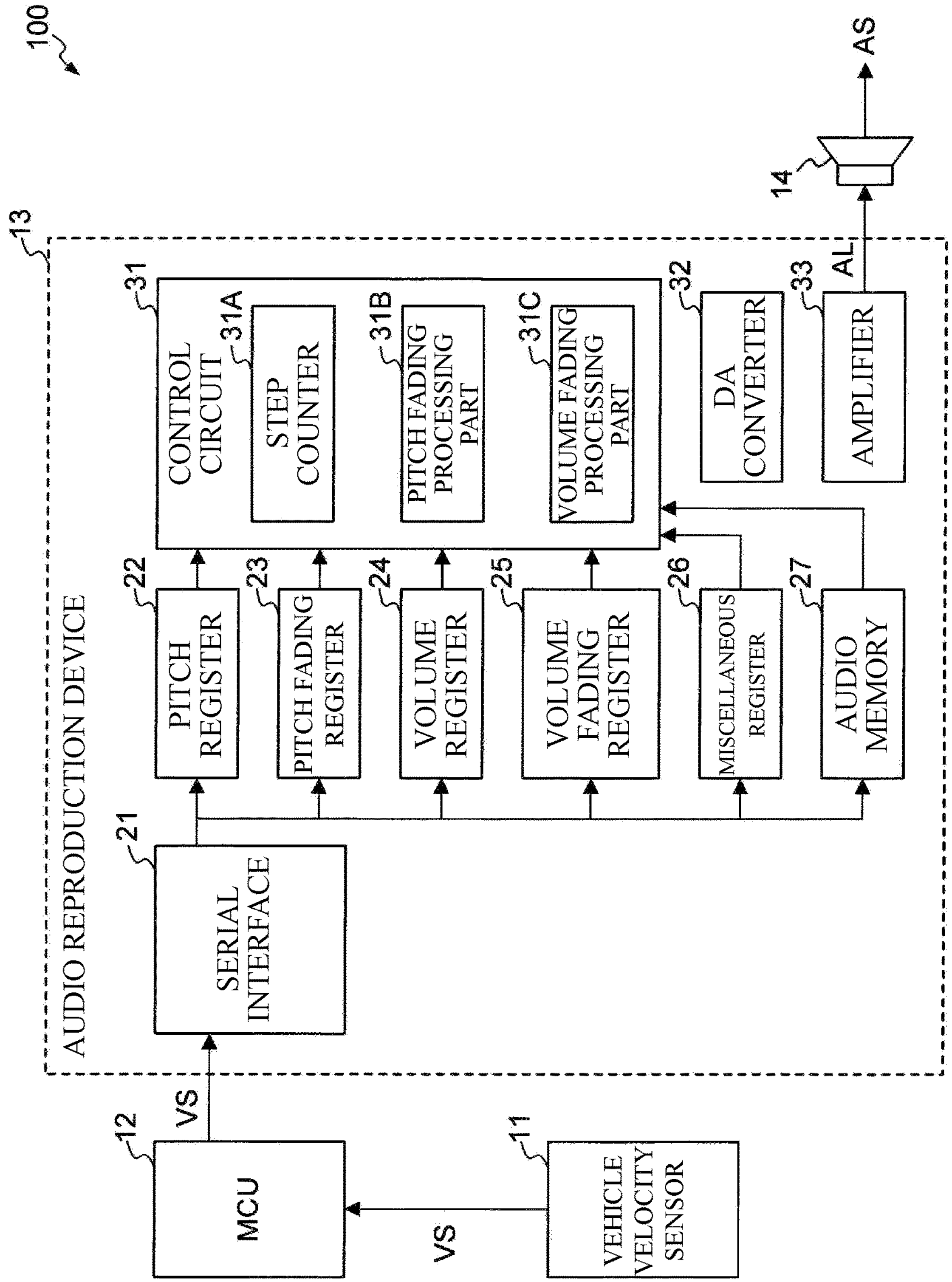
FIG. 2 is a block diagram showing an internal constitution of an audio reproduction device of Example 1.

FIG. 2 is a block diagram showing an internal constitution of the audio reproduction device 13. The audio reproduction device 13 includes a serial interface 21, a pitch register 22, a pitch fading register 23, a volume register 24, a volume fading register 25, a miscellaneous register 26, an audio memory 27, a control circuit 31, a DA converter 32, and an amplifier 33.

The serial interface 21 is an interface for serial communication used for transmitting data from the MCU 12 to the audio reproduction device 13 and is constituted of a serial peripheral interface (SPI), for example.

The pitch register 22 is a register circuit for storing the pitch of the vehicle approach sound signal AL reproduced by the audio reproduction device 13, that is, setting data related to a frequency. In the pitch register 22, writing of a pitch setting value is performed in response to writing operation from the MCU 12 via the serial interface 21. In addition, reading of the pitch setting value written in the pitch register 22 is performed by the control circuit 31.

In the present example, pitch fading processing of gradually changing a pitch of a vehicle approach sound is executed. At this time, in the pitch register 22, a value of the pitch in reproduction of audio which is being currently reproduced and a final target value for pitch change in the pitch fading processing are written together as pitch setting values. In the present example, based on the value of the pitch when the audio data stored in the audio memory 27 is reproduced as it is (that is, a fundamental frequency), for example, values of magnification such as “0.8 times” and “0.2 times” are stored in the pitch register 22 as the pitch setting values.

The pitch fading register 23 is a register circuit for storing setting data related to the pitch fading processing of a vehicle approach sound executed by the audio reproduction device 13. In the present example, a timing of change of the pitch in stages (step change) in the pitch fading processing, that is, a step setting value which is a setting value for defining a period of the stage is written in the pitch fading register 23.

In the present example, the pitch fading processing is performed by changing the pitch in stages in a predetermined cycle. For example, a step setting value indicating a cycle of pitch change is expressed as a count value obtained by counting a predetermined number of pulses of a clock signal. For example, when the pitch is changed in stages at a timing when four clock pulses have been counted, a corresponding step setting value becomes “0x00 to 0x03”.

Writing of the step setting value in the pitch fading register 23 is performed from the MCU 12 via the serial interface 21. In addition, reading of the step setting value written in the pitch fading register 23 is performed by the control circuit 31.

Reading of the pitch setting value from the pitch register 22 and reading of the step setting value from the pitch fading register 23 by the control circuit 31 are cyclically performed at a predetermined time interval. For example, reading by the control circuit 31 is performed at a time interval based on the clock pulse of the clock signal (for example, a time interval corresponding to 10 pulses). The pitch setting value and the step setting value are changed when the MCU 12 performs writing in the pitch register 22 and the pitch fading register 23 during a period from reading of 1 by the control circuit 31 to next reading, and the change is reflected in reproduction processing of audio when the control circuit 31 reads these.

The volume register 24 is a register circuit for storing the volume of a vehicle approach sound reproduced by the audio reproduction device 13, that is, setting data related to a sound volume. In the volume register 24, writing of a volume setting value is performed in response to writing operation from the MCU 12 via the serial interface 21. In addition, reading of the volume setting value written in the volume register 24 is performed by the control circuit 31.

In the present example, volume fading processing of gradually changing a volume of a vehicle approach sound is executed. At this time, in the volume register 24, a final target value for volume change in the volume fading processing is written as a volume setting value. In the present example, based on the value of the volume when the audio data stored in the audio memory 27 is reproduced as it is (that is, a fundamental sound volume), for example, values of magnification such as "1.2 times" and "3 times" are stored in the volume register 24 as the volume setting values.

The volume fading register 25 is a register circuit for storing setting data related to the volume fading processing of a vehicle approach sound executed by the audio reproduction device 13. In the present example, a timing of change of the volume in stages (step change) in the volume fading processing, that is, a step setting value which is a setting value for defining a period of the stage is written in the volume fading register 25. Writing of the step setting value in the volume fading register 25 is performed from the MCU 12 via the serial interface 21. In addition, reading of the step setting value written in the volume fading register 25 is performed by the control circuit 31.

Similar to the pitch register 22 and the pitch fading register 23, reading of the volume setting value from the volume register 24 and reading of the step setting value from the volume fading register 25 by the control circuit 31 are also cyclically performed at a predetermined time interval. The volume setting value and the step setting value are changed when the MCU 12 performs writing in the volume register 24 and the volume fading register 25 during a period from reading of 1 by the control circuit 31 to next reading, and the change is reflected in reproduction processing of audio when the control circuit 31 reads these.

The miscellaneous register 26 is a register circuit for storing setting data other than setting related to the pitch and the volume. For example, setting data related to reproduction parameters other than the pitch and the volume related to reproduction of audio is stored in the miscellaneous register 26. Writing of the setting data in the miscellaneous register 26 is performed by writing operation of the MCU 12 via the serial interface 21. In addition, reading of the setting data written in the miscellaneous register 26 is performed by the control circuit 31.

For example, the audio memory 27 is constituted of a nonvolatile semiconductor memory such as a NAND or NOR flash memory or a programmable ROM (PROM), or a storage medium such as a magnetic recording hard disk. The audio memory 27 stores a plurality of audio data groups corresponding to the traveling velocities of the vehicle CA. Each of the plurality of audio data groups is constituted of a serial audio data piece.

The control circuit 31 reads the audio data from the audio memory 27 and reproduces audio on the basis of the read audio data. At this time, the control circuit 31 reads the pitch setting value from the pitch register 22 and reads the volume setting value from the volume register 24, thereby performing reproduction of audio at a frequency corresponding to the read pitch setting value and a sound volume corresponding to the volume setting value.

In addition, the control circuit 31 has a step counter 31A, a pitch fading processing part 31B, and a volume fading processing part 31C.

The step counter 31A performs counting for measuring a timing of fading-change in the pitch fading processing and the volume fading processing. In the present example, the step counter 31A reads the step setting value from the pitch fading register 23 and the volume fading register 25 and repeatedly counts each of the read step setting values. For example, when the step setting value is "0x00 to 0x03", counting is repeatedly performed from 0 to 3 such as "0, 1, 2, 3, 0, 1, 2, 3, and so on". For example, the step counter 31A performs counting on the basis of the clock pulse of the clock signal.

The pitch fading processing part 31B changes the setting value for a reproduction frequency for each timing corresponding to the step setting value on the basis of the count by the step counter 31A. Accordingly, the pitch of audio during reproduction changes in stages.

Figure 3:
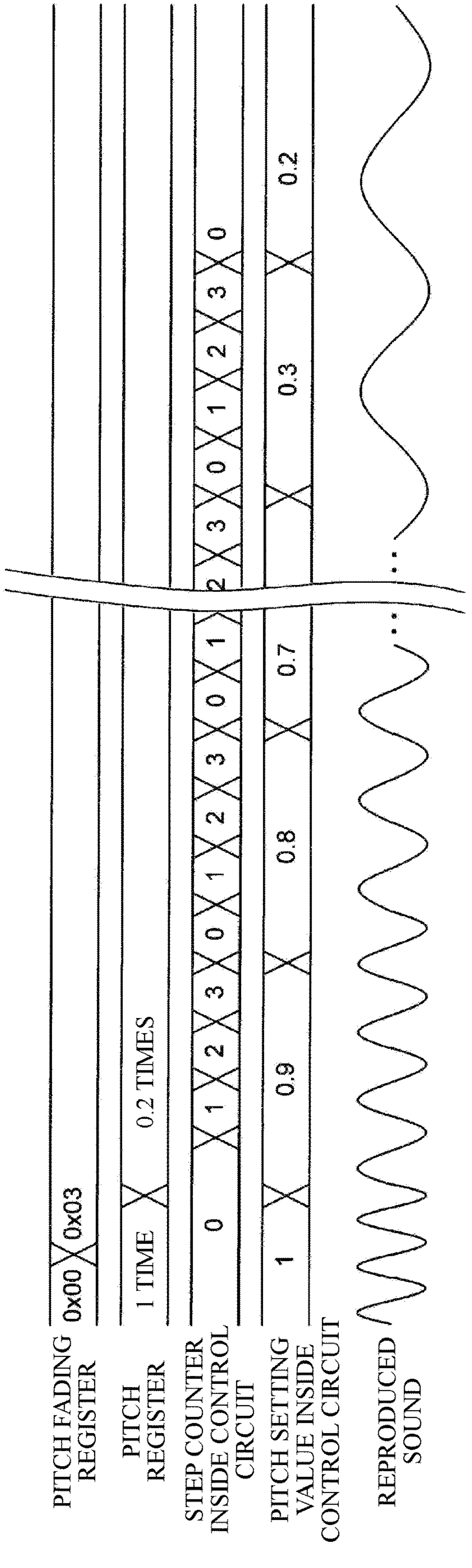
FIG. 3 is a flowchart showing a processing routine of pitch fading processing of Example 1.

FIG. 3 is a time chart showing an example of change of the setting value for each register and reproduced a sound in the pitch fading processing.

The pitch fading register 23 stores "0x00" to "0x03" as the step setting values. This indicates that the pitch is changed in steps of four counts of "0", "1", "2", and "3".

The pitch register 22 stores pitch setting values having contents in which the pitch is changed from 1 time to 0.2 times the fundamental frequency of audio data during reproduction.

The step counter 31A repeatedly performs counting from "0" to "3". The pitch fading processing part 31B changes the setting value for a reproduction frequency of audio in response to the count value of the step counter 31A. Accordingly, for each of four counts of the step counter 31A, the setting value for a reproduction frequency is sequentially changed from 1 time, 0.9 times, 0.8 times, 0.7 times, and so on to 0.3 times, and 0.2 times.

Accordingly, as shown in the lower stage of FIG. 3, the pitch fading processing in which the frequency of a reproduced sound changes in stages is performed. When the pitch changes to 0.2 times that is a target pitch setting value, the pitch fading processing ends.

With reference to FIG. 2 again, the volume fading processing part 31C executes the volume fading processing of changing a reproduction sound volume in stages for each timing corresponding to the step setting value on the basis of the count by the step counter 31A.

Figure 4:
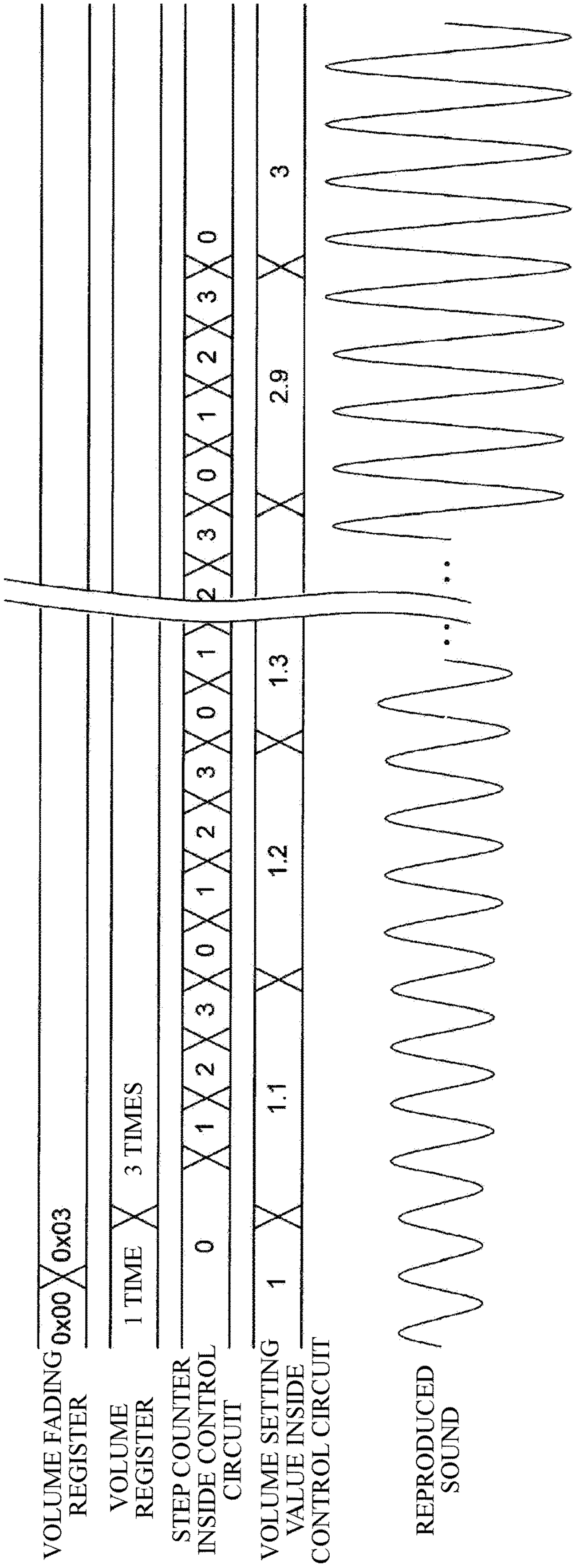
FIG. 4 is a time chart showing an example of a signal waveform of the pitch fading processing of Example 1.

FIG. 4 is a time chart showing an example of change of the setting value for each register and a reproduced sound in the volume fading processing.

The volume fading register 25 stores "0x00" to "0x03" as the step setting values. This indicates that the volume is changed in steps of four counts of "0", "1", "2", and "3".

The volume register 24 stores volume setting values having contents in which the sound volume is changed from 1 time to 3 times the fundamental sound volume of audio data during reproduction.

The step counter 31A repeatedly performs counting from "0" to "3". The volume fading processing part 31C changes the setting value for a reproduction sound volume of audio in response to the count value of the step counter 31A. Accordingly, for each of four counts of the step counter 31A, the setting value for a volume is sequentially changed from 1 time, 1.1 times, 1.2 times, 1.3 times, and so on to 2.9 times, and 3 times.

Accordingly, as shown in the lower stage of FIG. 4, the volume fading processing in which the sound volume of a reproduced sound changes in stages is performed. When the volume changes to 3 times that is a target volume setting value, the volume fading processing ends.

With reference to FIG. 2 again, the DA converter 32 is a digital-analog converter which receives an input of digital data, converts this into analog data, and outputs it. The DA converter 32 generates an analog audio reproduction signal by performing D/A conversion of audio reproduction data reproduced by the control circuit 31.

The amplifier 33 amplifies an audio reproduction signal generated by the DA converter 32 and outputs it as the vehicle approach sound signal AL. The vehicle approach sound signal AL output from the amplifier 33 is output to the outside of the vehicle CA from the speaker 14 as the vehicle approach sound AS.

Next, processing operation of the pitch fading processing executed by the audio reproduction device 13 of the present example will be described. Here, a case of performing the pitch fading processing during reproduction of audio will be described as an example.

Figure 5:
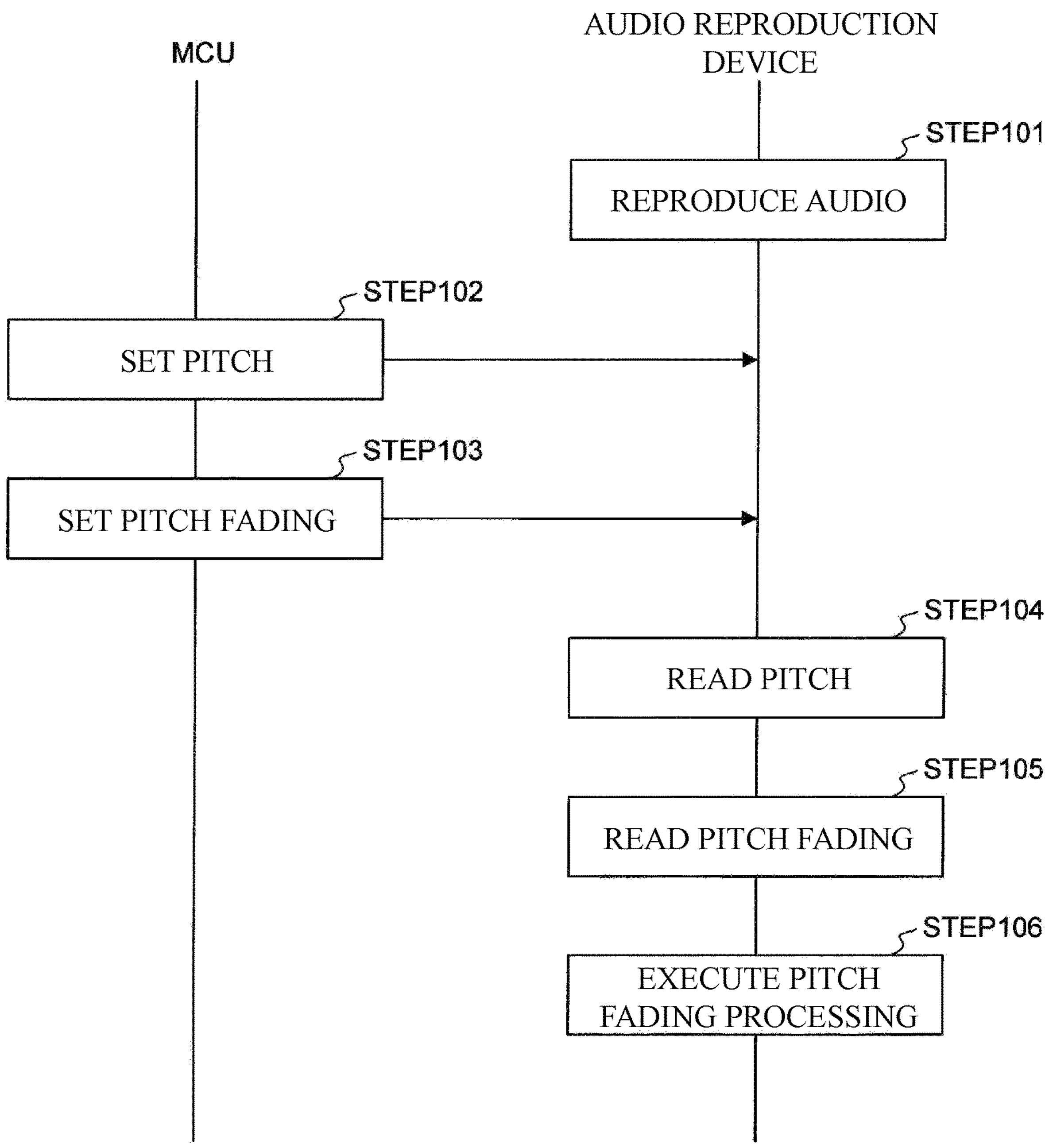
FIG. 5 is a flowchart showing a processing routine of volume fading processing of Example 1.

FIG. 5 is a flowchart showing a processing routine of the pitch fading processing in the present example.

The control circuit 31 of the audio reproduction device 13 reads the audio data from the audio memory 27 and reproduces audio on the basis of the read audio data (STEP 101). Accordingly, an audio signal corresponding to the audio data is output as the vehicle approach sound signal AL through the DA converter 32 and the amplifier 33.

The MCU 12 accesses the pitch register 22 via the serial interface 21 and sets a pitch setting value that becomes a target of pitch fading (STEP 102).

The MCU 12 accesses the pitch fading register 23 via the serial interface 21 and sets a step setting value indicating a timing of pitch change in the pitch fading processing (STEP 103).

The control circuit 31 of the audio reproduction device 13 reads the pitch setting value from the pitch register 22 (STEP 104).

The control circuit 31 reads the step setting value from the pitch fading register 23 (STEP 105).

The pitch fading processing part 31B of the control circuit 31 executes the pitch fading processing by changing the pitch in stages at a timing corresponding to the step setting value read in STEP 105 while having the pitch setting value read in STEP 104 as a target value (STEP 106).

The pitch fading processing is executed by the foregoing processing routine. When the pitch setting value is changed during fading processing, the pitch fading processing is continuously executed while having the changed pitch setting value as a new target value.

Next, processing operation of the volume fading processing executed by the audio reproduction device 13 of the present example will be described. Here, a case of performing the volume fading processing during reproduction of audio will be described as an example.

Figure 6:
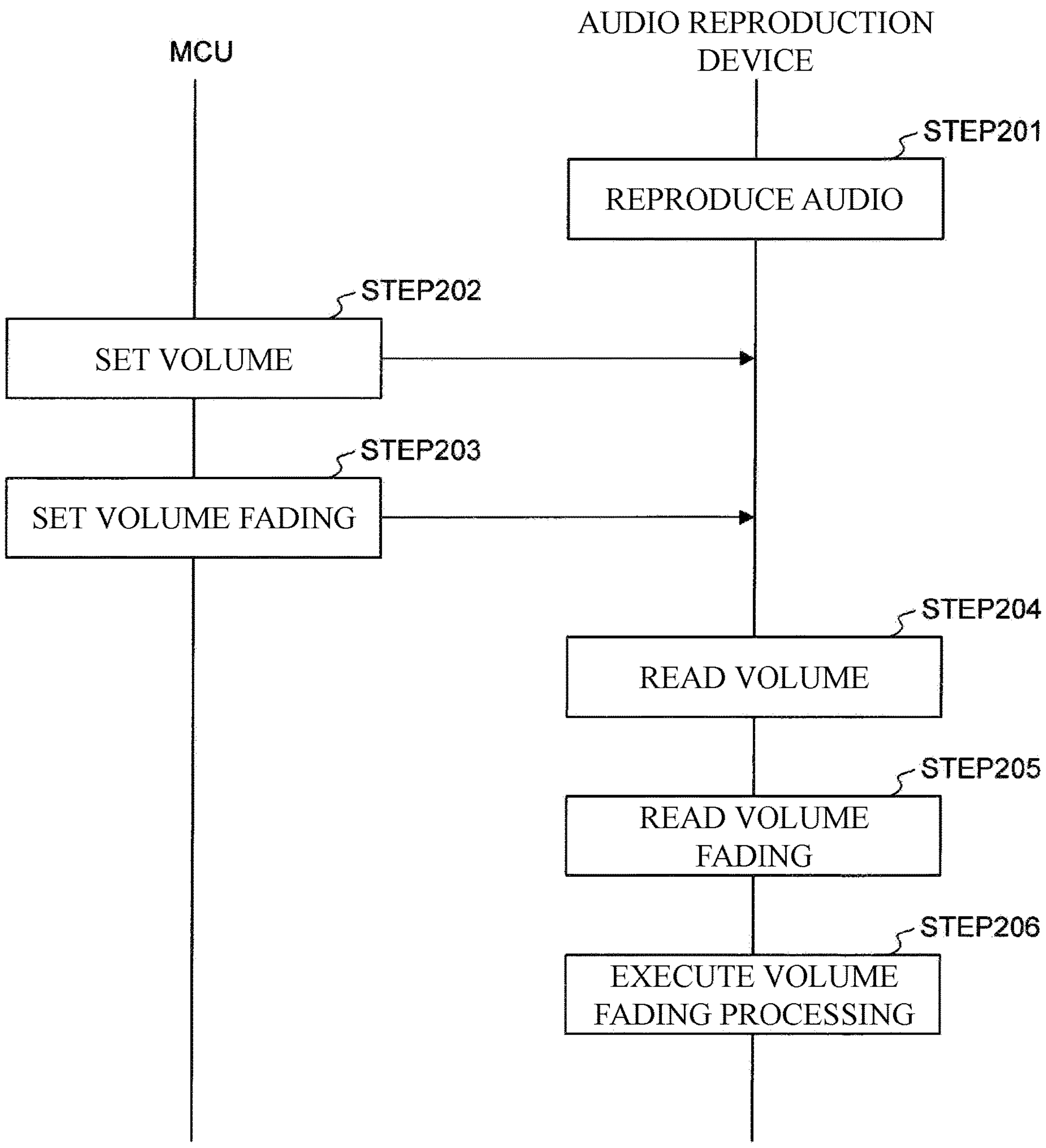
FIG. 6 is a time chart showing an example of a signal waveform of the volume fading processing of Example 1.

FIG. 6 is a flowchart showing a processing routine of the volume fading processing in the present example.

The control circuit 31 of the audio reproduction device 13 reads the audio data from the audio memory 27 and reproduces audio on the basis of the read audio data (STEP 201). Accordingly, an audio signal corresponding to the audio data is output as the vehicle approach sound signal AL through the DA converter 32 and the amplifier 33.

The MCU 12 accesses the volume register 24 via the serial interface 21 and sets a volume setting value that becomes a target of volume fading (STEP 202).

The MCU 12 accesses the volume fading register 25 via the serial interface 21 and sets a step setting value indicating a timing of volume change in the volume fading processing (STEP 203).

The control circuit 31 of the audio reproduction device 13 reads the volume setting value from the volume register 24 (STEP 204).

The control circuit 31 reads the step setting value from the volume fading register 25 (STEP 205).

The volume fading processing part 31C of the control circuit 31 executes the volume fading processing by changing the volume in stages at a timing corresponding to the step setting value read in STEP 205 while having the volume setting value read in STEP 204 as a target value (STEP 206).

The volume fading processing is executed by the foregoing processing routine. When the volume setting value is changed during fading processing, the volume fading processing is continuously executed while having the changed volume setting value as a new target value.

In the vehicle approach notification system 100 of the present example, the MCU 12 (host microcomputer) writes the pitch setting value and the volume setting value in the register provided inside the audio reproduction device 13 and writes the step setting values indicating timings of pitch fading and volume fading. The audio reproduction device 13 executes the pitch fading processing or the volume fading processing on the basis of the pitch setting value or the volume setting value and the step setting value set in the register.

According to such a constitution, unlike the case in which fading processing is performed by the host microcomputer writing a pitch setting value or a volume setting value in the register inside the audio reproduction device every time the pitch or the volume is changed, the pitch fading processing or the volume fading processing can be performed while access to the audio reproduction device from the host microcomputer is minimized. Therefore, a processing resource required for communication between a host microcomputer and an audio reproduction device in the related art can be allocated to other processing.

In addition, since the audio reproduction device side performs fading processing in stages toward the target value on the basis of the step setting value set in the register, fading processing can be smoothly performed at a regular timing.

Example 2

Next, Example 2 of the disclosure will be described.

Figure 7:
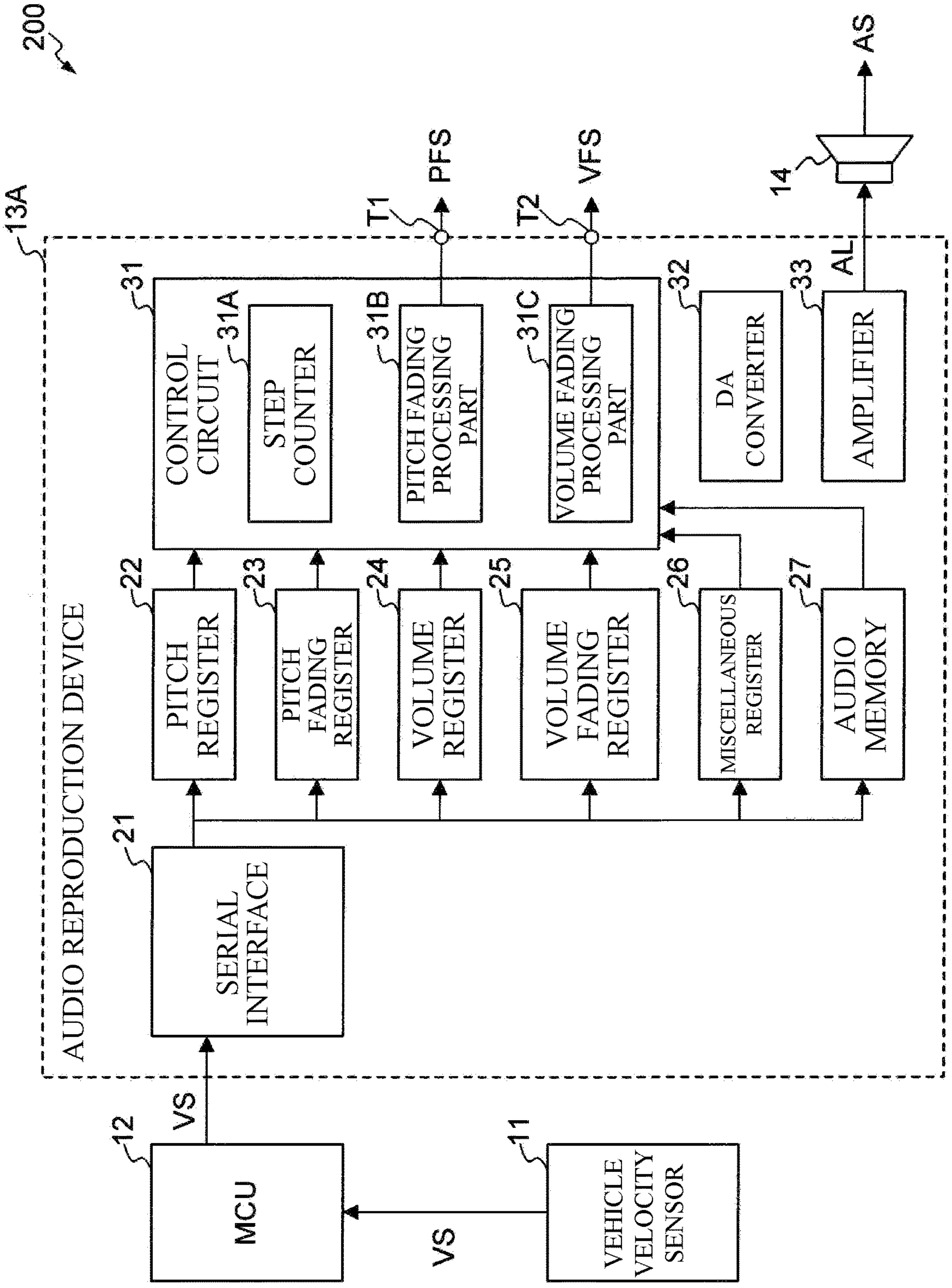
FIG. 7 is a block diagram showing an internal constitution of an audio reproduction device of Example 2.

FIG. 7 is a block diagram showing a constitution of a vehicle approach notification system 200 of Example 2. The vehicle approach notification system 200 of the present example differs from the vehicle approach notification system 100 of Example 1 in that an audio reproduction device 13A has external output terminals T1 and T2 and outputs a pitch fading output signal PFS and a volume fading output signal VFS.

When the pitch fading processing is executed, the pitch fading processing part 31B generates the pitch fading output signal PFS indicating that the processing is in progress. The pitch fading output signal PFS output from the external output terminal T1 toward the outside of the audio reproduction device 13. For example, the MCU 12 can perceive whether or not the audio reproduction device 13A is executing the pitch fading processing by receiving the pitch fading output signal PFS.

Figure 8:
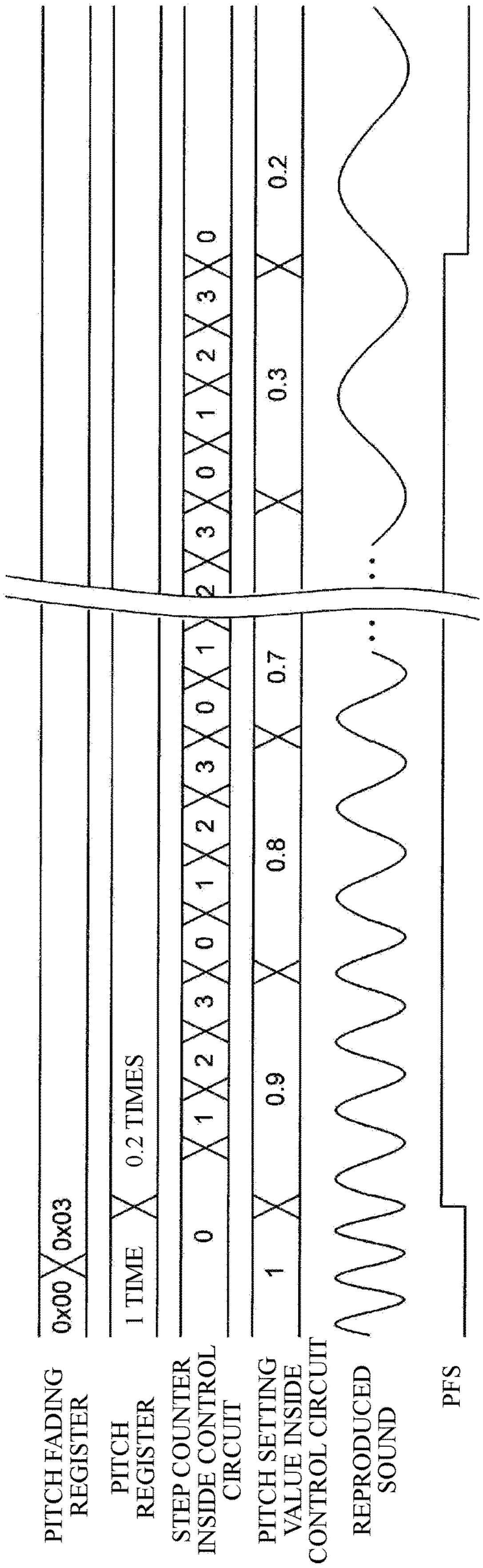
FIG. 8 is a time chart showing an example of a signal waveform of the pitch fading processing of Example 2.

FIG. 8 is a time chart showing an example of the pitch fading output signal PFS in the pitch fading processing of the present example together with change of the setting value for each register and a reproduced sound.

The pitch fading output signal PFS is a signal in which the signal level changes to a logic level 0 (that is, L level) when the pitch fading processing is not in progress and the signal level changes to a logic level 1 (that is, H level) when the pitch fading processing is in progress. The pitch fading processing part 31B changes the signal level of the pitch fading output signal PFS in response to change of the pitch setting value inside a control circuit during the pitch fading processing.

In the example shown in FIG. 8, the pitch fading processing part 31B changes the signal level of the pitch fading output signal PFS from the logic level 0 to the logic level 1 at a timing when the pitch setting value inside the control circuit is changed from 1 to 0.9. Thereafter, while the pitch setting value is changed in stages to 0.9, 0.8, 0.7, and so on in the pitch fading processing, the pitch fading processing part 31B maintains the signal level of the pitch fading output signal PFS in a state of the logic level 1. Further, the pitch fading processing part 31B changes the signal level of the pitch fading output signal PFS from the logic level 1 to the logic level 0 at a timing when the pitch setting value is changed to 0.2 that is the final target value of pitch fading.

With reference to FIG. 7 again, when the volume fading processing is executed, the volume fading processing part 31C generates the volume fading output signal VFS indicating that the processing is in progress. The volume fading output signal VFS is output from the external output terminal T2 toward the outside of the audio reproduction device 13. For example, the MCU 12 can perceive whether or not the audio reproduction device 13A is executing the volume fading processing by receiving the volume fading output signal VFS.

Figure 9:
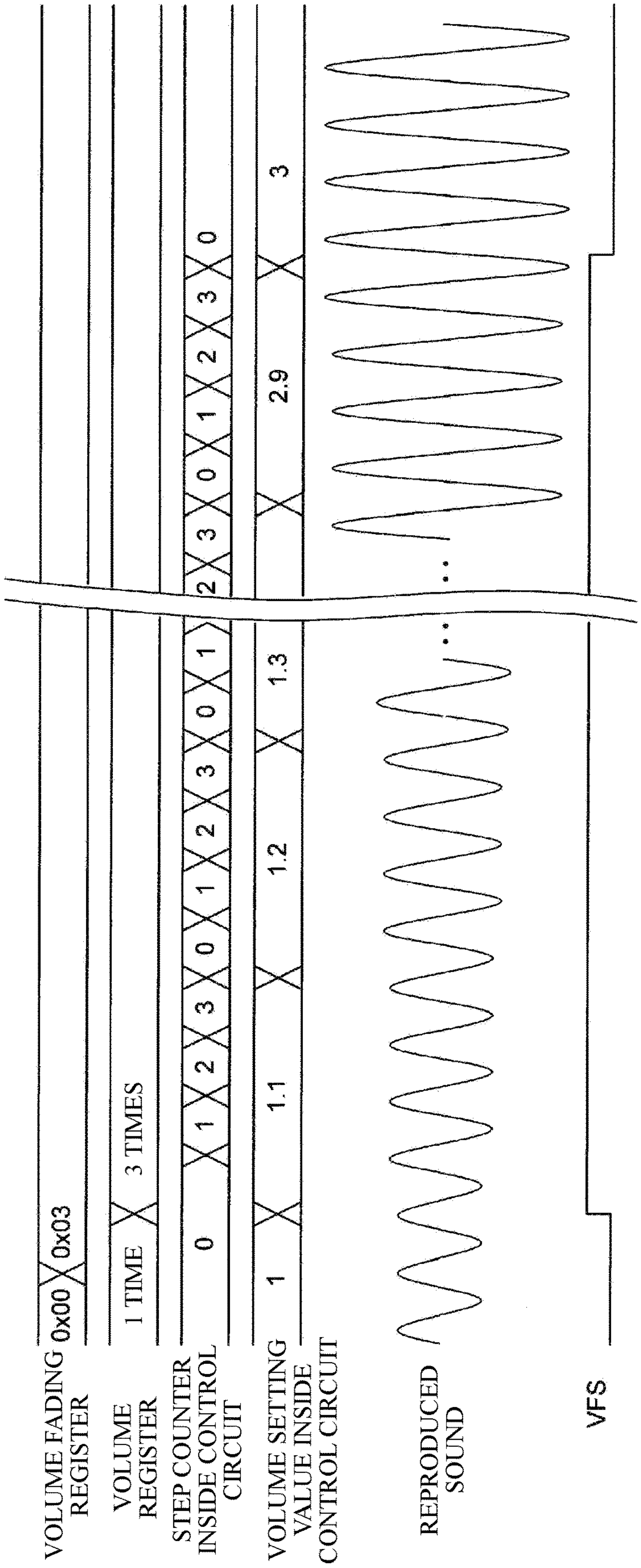
FIG. 9 is a time chart showing an example of a signal waveform of the volume fading processing of Example 2.

FIG. 9 is a time chart showing an example of the volume fading output signal VFS in the volume fading processing of the present example together with change of the setting value for each register and a reproduced sound.

The volume fading output signal VFS is a signal in which the signal level changes to the logic level 0 (that is, L level) when the volume fading processing is not in progress and the signal level changes to the logic level 1 (that is, H level) when the volume fading processing is in progress. The volume fading processing part 31C changes the signal level of the volume fading output signal VFS in response to change of the volume setting value inside the control circuit during the volume fading processing.

In the example shown in FIG. 9, the volume fading processing part 31C changes the signal level of the volume fading output signal VFS from the logic level 0 to the logic level 1 at a timing when the volume setting value inside the control circuit is changed from 1 to 1.1. Thereafter, while the volume setting value is changed in stages to 1.1, 1.2, 1.3, and so on in the volume fading processing, the volume fading processing part 31C maintains the signal level of the volume fading output signal VFS in a state of the logic level 1. Further, the volume fading processing part 31C changes the signal level of the volume fading output signal VFS from the logic level 1 to the logic level 0 at a timing when the volume setting value is changed to 3 that is the final target value of volume fading.

In the vehicle approach notification system 200 of the present example, the pitch fading output signal PFS indicating whether or not the audio reproduction device 13 is executing the pitch fading processing and the volume fading output signal VFS indicating whether or not the volume fading processing is being executed are output to the outside. When these signals are received and monitored by the MCU 12 (host microcomputer), for example, it is possible to detect timings to start and end fading processing, and it is possible to smoothly shift to execution of other control.

For example, when a power supply of the audio reproduction device 13 is shut down from the outside, the MCU 12 can wait until the volume changes to a mute state on the basis of the volume fading output signal VFS and can cut the power supply of the audio reproduction device 13.

The disclosure is not limited to the foregoing embodiment. For example, in each of the foregoing examples, a case in which the pitch and the volume are fading-changed has been described as an example. However, it may be constituted to be able to perform only one of the pitch fading processing and the volume fading processing. In addition, a target of fading-change is not limited to these, and other reproduction parameters related to reproduction of audio may be fading-changed.

In addition, in each of the foregoing examples, regarding setting of the pitch or the volume and setting of a step in fading processing, a case in which the MCU 12 performs setting in the register inside the audio reproduction device 13 via the serial interface 21 has been described as an example. However, unlike this, for example, it may be constituted to perform setting of these with respect to the audio memory 27. In addition, in place of the serial interface 21, it may be constituted to perform setting in the register via a parallel interface.

In addition, in the foregoing Example 2, a case in which the audio reproduction device 13 outputs the pitch fading output signal PFS and the volume fading output signal VFS to the outside of the LSI has been described as an example. However, unlike this, for example, it can also be applied to a case in which these signals are monitored inside the LSI of the audio reproduction device 13 and controlled inside the LSI. For example, it can also be applied to such a case in which the audio reproduction device 13 itself changes setting of the pitch or the volume, changes a phrase of a reproduced sound, or controls reproduction stop processing.

In addition, in each of the foregoing examples, a case in which the audio reproduction device constitutes a vehicle approach notification system has been described as an example. However, the constitution of the audio reproduction device of the disclosure is not limited to that mounted in a vehicle approach notification system and can be applied to all devices performing reproduction of audio.

What is claimed is:

1. An audio reproduction device, which is a reproduction device reading audio data from a memory and reproducing audio, the audio reproduction device comprising:

a reproduction control part constituted to be able to execute pitch fading processing of changing a frequency in stages or volume fading processing of changing a sound volume in stages during reproduction of audio;

a pitch register storing a pitch setting value that is a setting value for a frequency in reproduction of the audio in response to access from outside of the audio reproduction device;

a volume register storing a volume setting value that is a setting value for a sound volume in reproduction of the audio in response to access from the outside; and a fading register storing a step setting value that is a setting value for a form of change of a frequency or a sound volume in the pitch fading processing or the volume fading processing in response to access from the outside of the audio reproduction device, wherein the reproduction control part executes the pitch fading processing by changing the frequency of audio during reproduction in stages in a form based on the step setting value read from the fading register in response to change of the pitch setting value while having a pitch setting value after the change as a target value, and executes the volume fading processing by changing the sound volume of audio during reproduction in stages in a form based on the step setting value read from the fading register in response to change of the volume setting value while having a volume setting value after the change as a target value.

2. The audio reproduction device according to claim 1, wherein the step setting value is a setting value for determining a period for each stage of the change in stages.

3. The audio reproduction device according to claim 1, wherein the reproduction control part has a counter performing counting based on the step setting value and changes a pitch or a volume of audio during reproduction in stages at a timing corresponding to a count value indicated by the step setting value.

4. The audio reproduction device according to claim 1, wherein the audio data includes information of a fundamental frequency and a fundamental sound volume when the audio is reproduced, wherein the pitch register stores a magnification value based on the fundamental frequency as the pitch setting value, and wherein the volume register stores a magnification value based on the fundamental sound volume as the volume setting value.

5. The audio reproduction device according to claim 1, wherein the reproduction control part generates a fading processing output signal indicating that the pitch fading processing or the volume fading processing is being executed and outputs the fading processing output signal to the outside of the audio reproduction device.

6. The audio reproduction device according to claim 2, wherein the reproduction control part generates a fading processing output signal indicating that the pitch fading processing or the volume fading processing is being executed and outputs the fading processing output signal to the outside of the audio reproduction device.

7. The audio reproduction device according to claim 3, wherein the reproduction control part generates a fading processing output signal indicating that the pitch fading processing or the volume fading processing is being executed and outputs the fading processing output signal to the outside of the audio reproduction device.

8. The audio reproduction device according to claim 4, wherein the reproduction control part generates a fading processing output signal indicating that the pitch fading processing or the volume fading processing is being executed and outputs the fading processing output signal to the outside of the audio reproduction device.

9. An audio reproduction LSI comprising:

a reproduction control part constituted to read audio data from a memory, reproduce audio, and be able to execute fading processing of changing a reproduction parameter in stages during reproduction of the audio;

a setting register storing a parameter setting value that is a setting value for the reproduction parameter in response to access from outside of the audio reproduction LSI; and a fading register storing a step setting value that is a setting value for determining a period for each stage of change of the reproduction parameter in stages in the fading processing in response to access from the outside of the audio reproduction LSI, wherein the reproduction control part executes the fading processing by changing the reproduction parameter of audio during reproduction in stages in a form based on the step setting value read from the fading register in response to change of the parameter setting value while having a parameter setting value after the change as a target value.

10. The audio reproduction LSI according to claim 9, wherein the reproduction parameter is a frequency.

11. The audio reproduction LSI according to claim 9, wherein the reproduction parameter is a sound volume.

12. The audio reproduction LSI according to claim 9, wherein the reproduction control part generates a fading processing output signal indicating that the fading processing is being executed and outputs the fading processing output signal to the outside of the audio reproduction LSI.

13. The audio reproduction LSI according to claim 10, wherein the reproduction control part generates a fading processing output signal indicating that the fading processing is being executed and outputs the fading processing output signal to the outside of the audio reproduction LSI.

14. The audio reproduction LSI according to claim 11, wherein the reproduction control part generates a fading processing output signal indicating that the fading processing is being executed and outputs the fading processing output signal to the outside of the audio reproduction LSI.

15. An audio reproduction method executed by an audio reproduction device reading audio data from a memory and reproducing audio and having a reproduction control part constituted to be able to execute pitch fading processing of changing a frequency in stages or volume fading processing of changing a sound volume in stages during reproduction of the audio; a pitch register storing a pitch setting value that is a setting value for a frequency in reproduction of the audio; a volume register storing a volume setting value that is a setting value for a sound volume in reproduction of the audio; and a fading register storing a step setting value that is a setting value for a form of change of a frequency or a sound volume in the pitch fading processing or the volume fading processing, the audio reproduction method comprising:

reading the pitch setting value from the pitch register;

reading the volume setting value from the volume register;

reading the step setting value from the fading register;

executing the pitch fading processing by changing the frequency of audio during reproduction in stages in a form based on the step setting value read from the fading register while having a pitch setting value after the change as a target value when the pitch setting value read from the pitch register has changed; and executing the volume fading processing by changing the sound volume of audio during reproduction in stages in a form based on the step setting value read from the fading register while having a volume setting value after the change as a target value when the volume setting value read from the volume register has changed.

* * * * *